Patented July 21, 1925.

1,546,479

UNITED STATES PATENT OFFICE.

SHOWELL C. DENNIS, OF WOODBURY, NEW JERSEY, ASSIGNOR OF ONE-HALF TO MERWIN M. HART, OF CHICAGO, ILLINOIS.

CARBON REMOVER.

No Drawing. Application filed November 28, 1923. Serial No. 677,544.

*To all whom it may concern:*

Be it known that I, SHOWELL C. DENNIS, a citizen of the United States, residing at Woodbury, in the county of Gloucester and State of New Jersey, have invented certain new and useful Improvements in Carbon Removers, of which the following is a specification.

My invention relates to carbon removers, and is particularly useful in removing the carbon which accumulates in the cylinders of hydrocarbon or other internal combustion engines.

I am aware that various carbon removers have heretofore been employed, but these in general depend upon the principle of attempting to dissolve the oil or other medium with which the carbon is mixed, and are effective only to a limited degree in removing the light fluffy carbon on the surface, and do not remove the compactly caked carbon, which is largely mixed with oxides of iron.

It is the object of my invention to burn the carbon accumulating in the cylinders of the engine by the use of an auto-oxidation catalyst which has the function of causing the air introduced into the engine cylinders to burn the carbon, and I have found that this is effective not only in removing the light fluffy carbon, but also in burning the compactly caked carbon mixed with oxides of iron. After the carbon is burned in this manner, I have found that the oxides of iron are quickly discharged through the exhaust, and the cylinders are thus thoroughly cleaned.

It is a further object of my invention to employ an accelerator for hastening the oxidation action above mentioned, while at the same time securing a better permeability of the carbon deposit.

It is a still further object of my invention to employ the auto-oxidation catalyst and the accelerator in a suitable solvent so that perfect homogeneity of the compound is secured while at the same time it may be readily and simply applied to the cylinders of the engine.

In carrying out my invention, I have found that nitro-benzene is admirably adapted as an auto-oxidation catalyst, the presence of this compound serving to enable the air in the explosive mixture of the engine to burn or oxidize the carbon, while at the same time a certain amount of oxygen of the compound itself may be used, and the compound either wholly or partially destroyed.

It will be understood, however, that the primary function of this auto-oxidation catalyst is not to itself supply the oxygen for the burning of the carbon, but rather to promote the re-action by which the oxygen of the air is caused to burn the carbon.

Although I have mentioned nitro-benzene as the preferred auto-oxidation catalyst, other nitro derivatives, particularly those of the aromatic and aliphatic hydrocarbons, might readily be employed. Specific examples which may be mentioned are the nitro-toluenes and nitro-zylenes.

As the accelerator, I prefer to use furfural, and it will be understood that by specifically mentioning furfural, I refer also to the homologues thereof, and it may be that other aldehydes besides furfural could be used to accomplish the desired result.

As a solvent for the auto-oxidation catalyst and the accelerator, I prefer to use alcohol, and preferably a monohydric alcohol of the aliphatic series, and I have found that butyl alcohol is particularly adapted for the purpose.

In making up the carbon remover in its preferred form, I use equal parts, by weight, of nitro-benzene and furfural, and carefully add to the mixture butyl alcohol until the solution becomes wine-red in color and perfectly clear, thereby obtaining a homogeneous solution of the nitro-benzene and furfural.

In using the carbon remover in the cylinders of a hydrocarbon engine, the spark plugs are removed, and into each cylinder is sprayed approximately one-half ounce of the solution. The engine is allowed to stand for a few hours without operation, until absorption of the carbon remover by the carbon is complete. The engine is then started in the usual manner and the oxidation of the carbon then takes place in the manner above described, namely, by causing the air in the explosive charge to burn the carbon. While the carbon is being removed, a white smoke will be observed coming from the exhaust. After the engine has been run for a short time, it will be observed that the carbon has been completely removed.

An alternative method of employing my improved carbon remover is to inject the same through the intake manifold, or it may be introduced into the hydrocarbon or other fuel of the engine.

I have found that not only does the compound which I have described remove the carbon in a very efficient manner, but it is also without deleterious effect on the metal, rubber, or other parts connected with the engine.

It will be understood by those skilled in the art that many changes could be made in the composition of the carbon remover which I have described without departing from the spirit or scope of my invention.

What I claim is:

1. A carbon removed for internal combustion engines, comprising the combination of a nitro derivative of an aromatic hydrocarbon, furfural, and an alcohol solvent.

2. A carbon remover for internal combustion engines, comprising the combination of a nitro derivative of an aromatic hydrocarbon, furfural, and a solvent consisting of a monohydric alcohol of the aliphatic series.

3. A carbon remover for internal combustion engines, comprising the combination of nitro-benzene, furfural, and a solvent consisting of a monohydric alcohol of the aliphatic series.

4. A carbon remover for internal combustion engines, comprising the combination of nitro-benzene and furfural in substantially equal parts and sufficient butyl alcohol to bring the said nitro-benzene and furfural into a homogeneous solution.

Signed at Woodbury, New Jersey, this twenty second day of November, 1923.

SHOWELL C. DENNIS.

Witness:
CLARENCE B. TAYLOR.